Aug. 4, 1925.
J. F. PRAX
1,548,552
BATTERY CONNECTION
Filed June 16, 1920
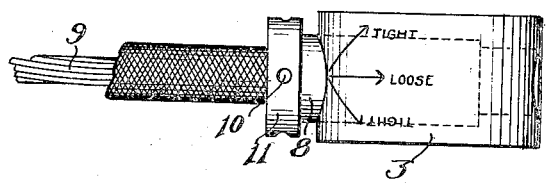
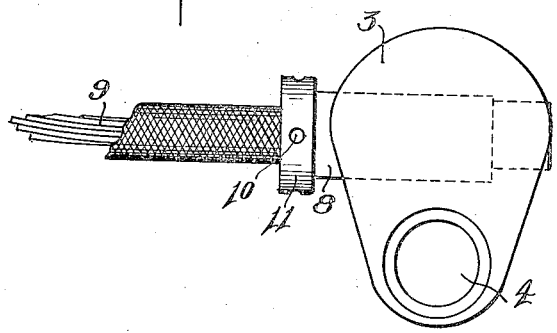
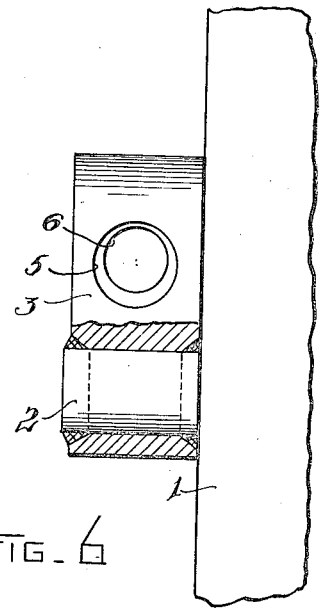
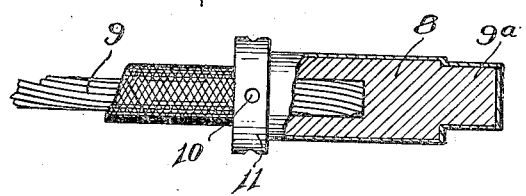
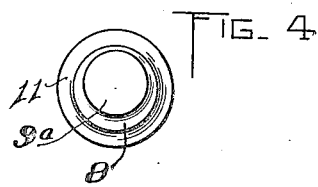
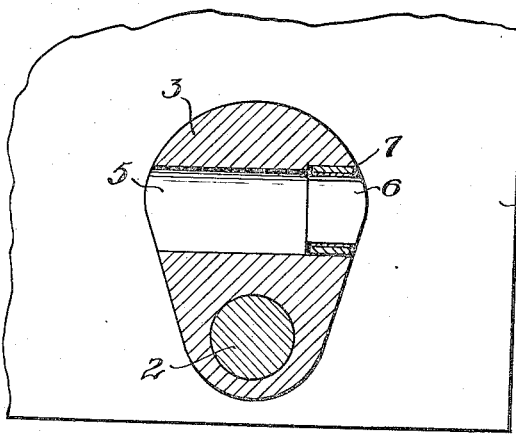
INVENTOR.
Joseph F. Prax
BY
Davis & Timms
his ATTORNEYS.

Patented Aug. 4, 1925.

1,548,552

UNITED STATES PATENT OFFICE.

JOSEPH F. PRAX, OF ROCHESTER, NEW YORK.

BATTERY CONNECTION.

Application filed June 16, 1920. Serial No. 389,395.

*To all whom it may concern:*

Be it known that I, JOSEPH F. PRAX, a citizen of the United States, and resident of Rochester, in the county of Monroe and State of New York, have invented certain new and useful Improvements in Battery Connections, of which the following is a specification.

The present invention relates to a battery connection and more particularly to the manner of connecting a conductor terminal of the battery, an object of this invention being to provide a connection which will give an efficient conducting contact without the use of screws or solder while at the same time being readily made or broken.

To this and other ends, the invention consists of certain parts and combinations of parts all of which will be hereinafter described, the novel features being pointed out in the appended claim.

In the drawings:

Fig. 1 is a side view of the intermediate connecting member showing the conductor terminal attached thereto;

Fig. 2 is a plan view of the parts shown in Fig. 1;

Fig. 3 is a side view, partially in section, of the conductor terminal;

Fig. 4 is an end view of the conductor terminal;

Fig. 5 is a view, partially in section, showing the intermediate connecting member attached to the battery terminal; and Fig. 6 is a side view, partially in section, of the intermediate member connected to the battery terminal.

Referring more particularly to the drawings, 1 indicates the battery, only a fragment of which is shown. 2 indicates the battery terminal which is usually of cylindrical form. Secured to this battery terminal is an intermediate connecting member 3 preferably formed of lead and having an opening 4 extending therethrough, preferably near one side of the latter. This opening is adapted to receive the terminal 2 of the battery from either end thereof, so that either of the flat faces of the connecting member may be disposed toward the battery. The connecting member is also provided with an opening which has a large bore 5 and a smaller bore 6, the smaller bore being eccentric to the axis of the large bore and preferably being formed by providing a reinforcing ring 7 of copper, coated on all of its exposed faces by zinc. The axis of the large bore 5 is at right angles to the axis of the opening 4 so that the intermediate member 3 may have its connection with the battery terminal 2 shifted in order that the conductor terminal may lead into the connection 3 from either side thereof. The conductor terminal is, in this instance, in the form of a plug 8 in which the conductor 9 is inserted. This plug 8 is preferably formed of copper with an exterior coating of zinc. It has an inner cylindrical portion adapted to fit the bore 5 of the opening in the intermediate member 3 and also has a reduced cylindrical portion 9ª eccentric to the inner cylindrical portion and adapted to fit the bore 6. By this construction after the conductor terminal is fitted in the intermediate connecting member 3, it may be turned in either direction so as to cause a binding action between the conductor terminal and the intermediate connection 3. This rotary movement may be effected by a suitable instrument introduced in any one of a number of openings 10 formed in the periphery of an annular flange 11 on the conductor terminal at the inner end of the larger cylindrical portion of said terminal.

This invention permits the conductor terminal to be readily connected to the terminal of the battery without the use of solder or screws, and at the same time permits the ready disconnection of such conductor terminal. The intermediate member being reversible, and at the same time connecting with the battery terminal in such a manner that it may turn thereon about the axis of the terminal, permits the conductor terminal to connect with the battery when leading from any direction.

What I claim as my invention and desire to secure by Letters Patent is:

A battery connection comprising a conductor terminal having two external cylindrical portions, one of which is smaller than and eccentric to the other and is arranged at the outer end of the terminal, there being provided a shoulder between the two cylindrical portions, and an intermediate connecting member having an opening therein for the reception of the battery terminal and having an opening at right angles to and at one side of the first named opening formed with two cylindrical bores, one of which is smaller than and eccentric to the other, there being provided a shoulder between the two bores for engagement by the shoulder on the conductor terminal, said bores receiving the cylindrical portions of the conductor terminal and causing the binding of the latter upon the rotation of the same in the opening of the intermediate member.

JOSEPH F. PRAX.